(12) United States Patent
St-Jacques

(10) Patent No.: US 8,536,824 B2
(45) Date of Patent: Sep. 17, 2013

(54) LOSSLESS DYNAMIC BATTERY EQUALIZER SYSTEM AND METHOD

(75) Inventor: Alain St-Jacques, St-Bruno (CA)

(73) Assignee: Mi-Jack Canada, Inc., Hazel Crest, IL (US)

( * ) Notice: Subject to any disclaimer, the term of this patent is extended or adjusted under 35 U.S.C. 154(b) by 220 days.

(21) Appl. No.: 12/426,655

(22) Filed: Apr. 20, 2009

(65) Prior Publication Data

US 2009/0278489 A1 Nov. 12, 2009

Related U.S. Application Data

(60) Provisional application No. 61/071,265, filed on Apr. 18, 2008.

(51) Int. Cl.
*H02J 7/00* (2006.01)
(52) U.S. Cl.
USPC ........... 320/103; 320/108; 320/145; 320/116; 320/118; 320/119
(58) Field of Classification Search
USPC .................. 320/103, 108, 116, 118, 119, 123, 320/129, 139–141, 145; 307/104
See application file for complete search history.

(56) References Cited

U.S. PATENT DOCUMENTS

| | | | |
|---|---|---|---|
| 5,063,341 A * | 11/1991 | Gali | 320/160 |
| 2004/0032236 A1 * | 2/2004 | Canter | 320/137 |
| 2004/0135545 A1 * | 7/2004 | Fowler et al. | 320/118 |
| 2005/0140335 A1 * | 6/2005 | Lee et al. | 320/118 |
| 2007/0096696 A1 * | 5/2007 | Lefley et al. | 320/141 |
| 2008/0018300 A1 * | 1/2008 | Zaag et al. | 320/118 |

FOREIGN PATENT DOCUMENTS

EP 1814206 A1 * 8/2007
KR 10-2007-0119438 A * 12/2007

* cited by examiner

*Primary Examiner* — Jermele M Hollington
*Assistant Examiner* — Temilade S Rhodes-Vivour
(74) *Attorney, Agent, or Firm* — McCracken & Frank LLC

(57) ABSTRACT

A system and method dynamically equalizes battery voltages with low inherent power losses in a string of series connected electrochemical batteries. The method includes charging/discharging a group of batteries using magnetic storage in a transformer with bipolar magnetic excursion, individually isolated circuits and pulsed energy transfer. A method also exchanges current between batteries using direct current transfer between them and limiting inductance. Using this method, battery voltage may be measured from an isolated circuit, thus enabling information transfer to a central monitoring system. The method also has the benefit of providing an estimation of battery internal resistance from isolated circuits in the series of batteries.

9 Claims, 9 Drawing Sheets

LOSSLESS DYNAMIC BATTERY EQUALIZER SYSTEM AND METHOD

This application claims benefit of U.S. Ser. No. 61/071,265, filed 18 Apr. 2008, and which application is incorporated herein by reference. To the extent appropriate, a claim of priority is made to the above disclosed application.

FIELD OF THE INVENTION

The present invention generally relates to batteries. More particularly, the present invention relates to a system and method of dynamically equalizing battery voltages with low inherent power losses in a string of series connected electrochemical batteries.

DEFINITIONS

The following definitions are used herein:

A battery is generally a single cell or a series of cells in a single enclosure.

A battery pack is generally a set of battery enclosures connected in series to form a high voltage electrical energy storage system accumulating and regenerating electrical current.

A cell is the smallest element of an electrochemical accumulator. It may be combined to other cells in a single battery enclosure or constitute the single element of a battery. The typical cell voltage is generally dependent on the type of technology.

A MOSFET is a Metal Oxide Semiconductor Field Effect Transistor which is a power switching device capable of sequentially conducting and opening an electrical circuit at a very fast rate.

A Transformer is an inductive circuit generally having more than one circuit winding, galvanically isolated but magnetically coupled.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BACKGROUND OF THE INVENTION

Electrochemical batteries are frequently used to store energy in a wide variety of applications. Amongst those applications, several call for high-voltage storage such as in UPS (Uninterruptible Power Supplies) and transport applications. In this last field of application, total voltage range may vary from 24 to 42V or even well above 500V. Since most of the electrochemical technologies in use or in development today have typical cell voltages between 1 and 5 Volts, several cells have to be connected in series to achieve the desired total output voltage required. For example, locomotives were built by the Applicant using a string of 336 cells of 2V to reach a nominal voltage of 672V. Use of high voltage supply system is frequently dictated by load constraints that do not always enable charging and discharging the battery pack at recommended low and high voltage levels that would maximize the battery life.

When used in long series strings, severe problems may occur if one cell deteriorates more rapidly than others. In this condition, the battery pack is able to supply large currents in a given load while one cell may have a higher internal resistance leading to overheat and possible fire or explosion. Mitigation techniques used on an industrial basis consisted mostly in measuring individual cell voltages and/or temperature in operation to detect failing devices and disable high-power operation. Measurement of cell resistivity, mostly on specific surveys, is more complex but also informative of the components health.

It is generally recognized that battery cell longevity benefits from frequent current circulation. Tests performed on cells from which a constant small current is drawn show better consistency with time than cells at rest. However, draining constant current dissipates power and requires more frequent recharges, which goes against the purpose of using batteries for energy storage. Another aspect of battery longevity relates to minimization of sulfation deterioration by pulsed current through the battery, in charge or discharge modes.

Security constraints (IEEE 1491) states that the battery monitor design should be such that a catastrophic failure to the monitor should not have any effect on the battery system, critical load, or personnel in the immediate area. This suggests that any battery management or equalizer system would preferably be disconnected from the series string if the string becomes broken at any point. As the equalizer circuit is concerned, it is advantageous that each battery to equalizer circuit be galvanically isolated from other battery circuits and, that upon detection of a broken battery pack, the circuit would still operate with possible reduced performance at least in order to be able to report the fault.

PRIOR ART

In order to achieve the goal of circulating current while not dissipating a significant amount of energy, several patents were issued. Some proposals rely on diverting the current of a main charger circuit from the mostly recharged cells in a parallel path. Such diversions rely on high precision voltage measurement and results in heat dissipation (U.S. Pat. No. 5,504,415) or partial energy recovery (European App. 0 652 620 A1).

In U.S. Pat. No. 5,479,083, it is proposed to use N−1 inductors and 2*(N−1) low resistance Mosfet transistors for N cells (see FIG. 1a). The circuit is used in conjunction with a full voltage system charger to naturally divert charging current so that the lower voltage cells receive more charging current. Globally, this system uses almost twice the number of transistors and as many inductors as the number of cells. A similar approach, shown in FIG. 1b for only 2 batteries, uses a Flyback transformer to exchange energy between cells such that the main charger current is diverted from higher voltage cells to lower ones.

Other proposals are based on energy exchange between batteries rather than diverting main charger current. One of them uses capacitive energy exchange (PCT App. No. WO 97/4487) by which energy is transferred from cells to capacitors and back to the battery cells. To control and minimize switching losses, magnetic inductors are added.

Because of higher efficiency and for reliability purposes, most proposed approaches use an inductive type of energy transfer and recovery. In a more complex proposal in PCT application No. WO 99/62163 (see FIG. 2), a combination of four (4) Mosfets is suggested with a transformer and a capacitor. The main disadvantage of this circuit is the large number of components, the close interconnection between batteries and the duplication to cover several cells.

In more recent proposed patents (U.S. Pat. No. 6,670,789 and EP 1 575 143 A2 by Anzawa & al.), the circuit uses a flyback transformer by which the energy is exchanged between several batteries through a single magnetic storage. In the event that a battery is charged at a higher voltage than others, this circuit may lead to high current surges. To prevent this, in U.S. Pat. No. 6,670,789, an energy dissipating resistor may be added. In EP 1 575 143 A2, magnetic energy storage is unipolar and energy dissipating diodes were added to prevent high current from direct energy transfer between batteries during charging. In addition, a circuit is proposed to measure both the highest and the lowest battery voltages.

SUMMARY OF THE INVENTION

These and other advantages will be apparent from the disclosure of the invention(s) contained herein.

The inventions and their various embodiments and configurations disclosed herein are directed generally to a dynamic battery equalizer system that prevents cell voltage difference build-up by transferring energy from higher charged cells to lower charged cells. In order not to reduce significantly the energy reserve, the technique works with negligible losses. With extensive bipolar magnetic use, the circuit provides galvanic isolation from cell-to-cell even for an equalizer covering several cells. Whenever the main battery string disconnects, the system may loose only part of the battery equalizer unit without any detrimental effects on remaining operational circuits. It makes possible cell resistance estimation, an uncommon benefit from standard equalizing and monitoring systems. The inventions disclosed herein may be used on any high-voltage battery pack using several cells in series. Such applications cover emergency uninterruptible power systems (UPS), transportation packs, telecommunications back-up supply units, etc. It can also be favorably used on any type of cell technology, irrespective of the sensitivity of the technology state-of-charge (SOC) with respect to nominal cell voltage.

According to the present invention, there is provided a method of charging/discharging a group of batteries with galvanically isolated circuits comprising the steps of:

a) providing a transformer with bipolar magnetic excursion for transferring energy and linking the batteries; and b) pulsing energy transfer between the batteries.

According to the present invention, there is also provided a method of exchanging current between batteries comprising the steps of:

a) transferring direct current between the batteries; and b) using a current limiting inductance.

Preferably, the above-mentioned methods further comprise the steps of:

c) measuring battery voltage from an isolated circuit; and d) transferring information to a central monitoring system.

Preferably, the above-mentioned methods further comprise the step of:

e) estimating battery internal resistance from said isolated circuit.

According to the present invention, there is also provided a system for charging/discharging a group of batteries with galvanically isolated circuits comprising:

a transformer with bipolar magnetic excursion for transferring energy and linking the batteries; and pulsing means for pulsing energy transfer between the batteries.

Preferably, the system further comprises:

measuring means for measuring battery voltage from an isolated circuit; and transferring means for transferring information to a central monitoring system.

Preferably, the system further comprises estimating means for estimating battery internal resistance from said isolated circuit.

The above-described inventions and their embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

These and other objects and advantages of the invention will become apparent upon reading the detailed description and upon referring to the drawings in which.

DETAILED DESCRIPTION OF PREFERRED EMBODIMENTS

The Proposed Dynamic Battery Equalizer System (DBES)

Figure 1:
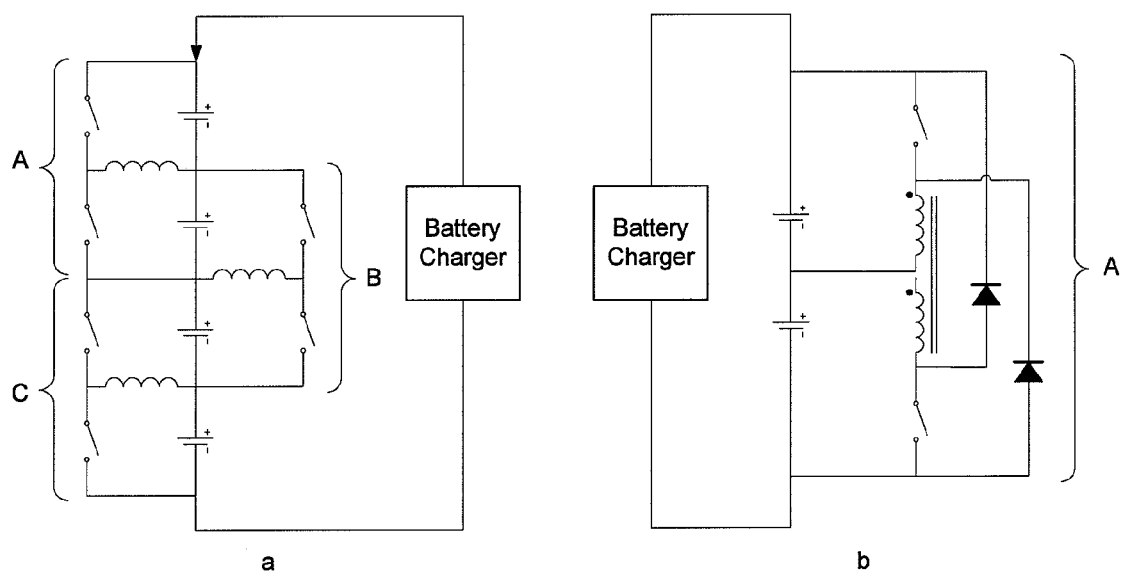
FIG. 1 is a schematic view of a prior art circuit using charging current deviation energy balance.
Figure 2:
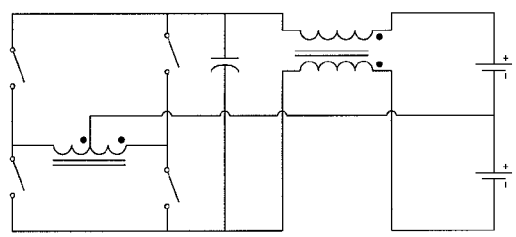
FIG. 2 is a schematic view of a prior art circuit using inductive-capacitive energy balance for a capacitive-inductive interconnected battery charge transfer.
Figure 3:
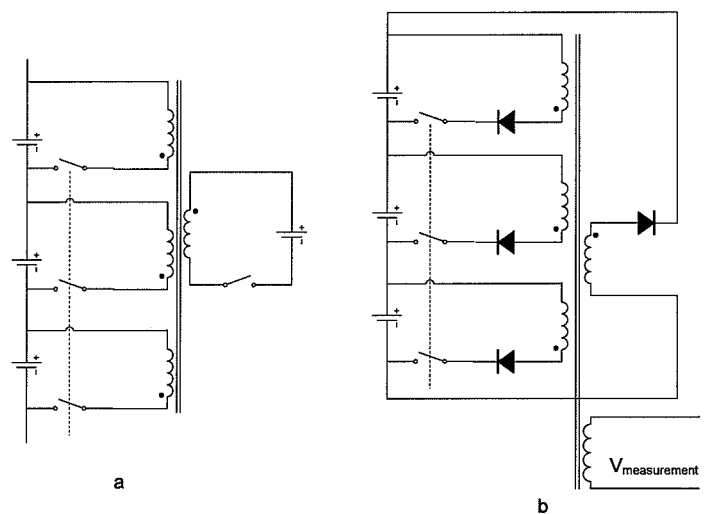
FIG. 3 is a schematic view of a prior art circuit using magnetic energy exchange for isolated magnetic energy transfer between batteries.
Figure 4:
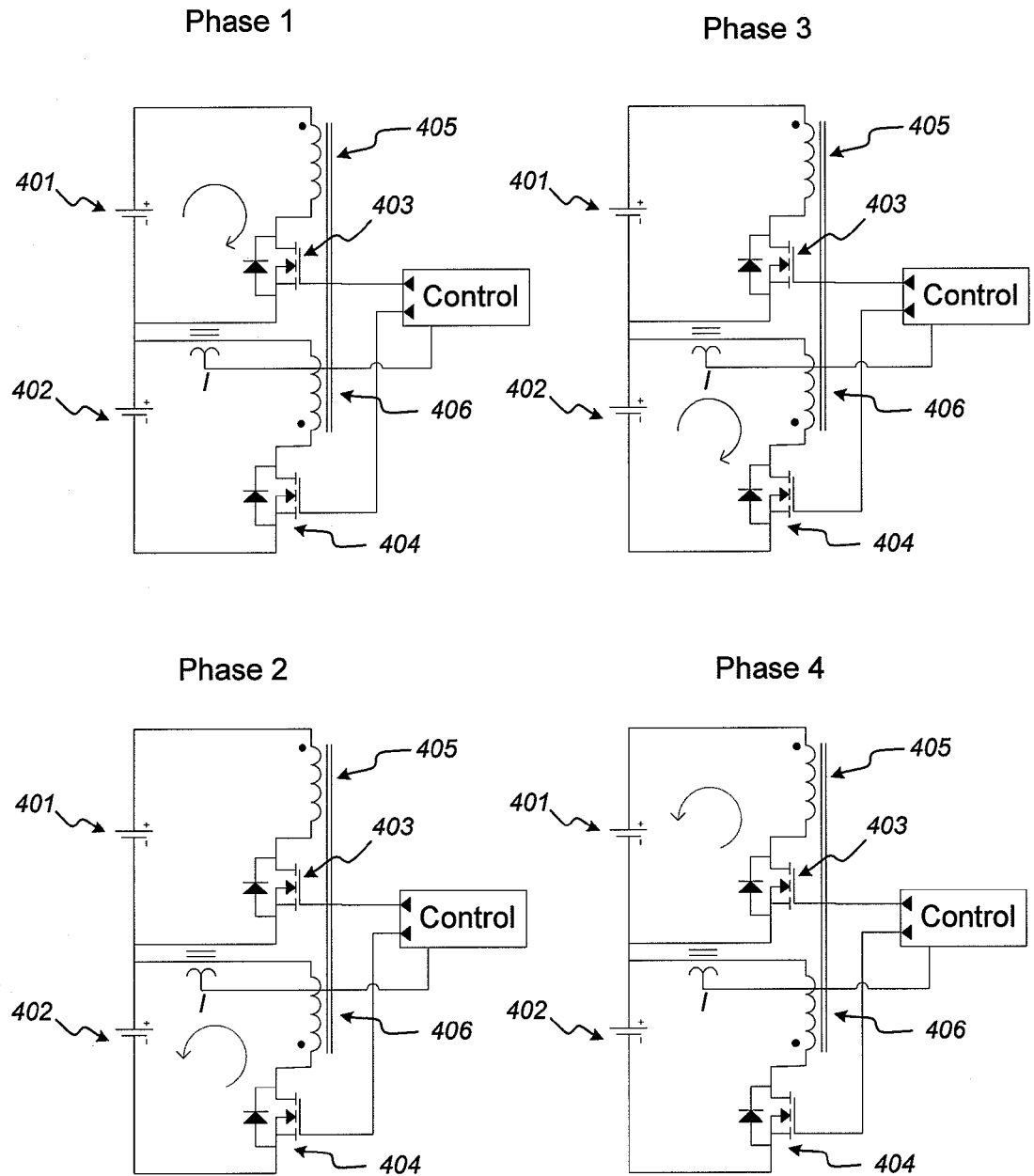
FIG. 4 is a schematic view of a circuit according to a preferred embodiment of the present invention using a first energy balance mechanism through magnetic flyback energy exchange.

The main advantages of the dynamic battery equalizer system (DBES) method disclosed herein are:

Single system operation for multiple batteries
Galvanically isolated circuit for each battery
Optimum use of magnetic components due to bipolar operation
Minimum number of components
3 ways of energy transfer processes
Desulfation prevention through pulsed currents
Isolated monitoring functions
Characteristic battery voltage and impedance determination
Single battery characterization
Secure battery pack disconnection capability DBES—Basic Operation As illustrated in FIG. 4, the preliminary circuit of the invention consists in an energy transfer circuit between two batteries 401 and 402. Each battery may consist in a single cell, stack of several series cells or parallel combination of both. The DBES operation is divided in 4 phases explained below.

At the beginning of phase 1, transistor 403 conducts, while transistor 404 is kept opened, winding 405 of the energy transfer transformer starts accumulating energy in its magnetizing inductance through rising current. The current rise slope is defined by Vbat/Lm where Vbat is the voltage of the battery 401 and Lm is the magnetizing inductance of the transformer 405-406. During that sequence, secondary winding 406 is being polarized such that the voltage appearing on open transistor 404 is typically the sum of the two batteries, approximately twice that of a battery nominal voltage.

After a fixed period of time Tp, transistor 403 is controlled to switch in its open state which corresponds to start of DBES phase 2. As a consequence of this operation, energy transferred to the transformer through winding 405 starts to decay through winding 406 and the parasitic diode of the transistor 404 in the battery 402. This type of magnetic energy transfer is known in power electronics as a "flyback converter". While current flows through the diode of transistor 404, this later will be controlled to switch in its closed state to minimize losses in the transistor 404.

After the current has decayed to zero, keeping transistor 404 closed will engage phase 3 of the dynamic charge cycle. Doing so will have the battery 402 provide a current rise in the transformer winding 406 through transistor 404 for a similar period Tp as during phase 1. After the fixed delay Tp, transistor 404 is controlled to switch in its open state which corresponds to start of DBES phase 4. As a consequence of this operation, energy transferred to the transformer through winding 406 starts to decay through winding 405 and the parasitic diode of the transistor 403 in the battery 401, again as a "flyback converter". While current flows through the diode of transistor 403, this later is controlled to switch in its closed state to minimize losses in the transistor 403. After the current decays to 0, the transistor 403 is kept open to repeat the phase 1 above.

Phase 3 of the DBES cycle is identical to the phase 1 except that it charges the transformer magnetic energy in opposite direction. For a given amount of energy, this process makes optimum use of the transformer capacity by using a minimum amount of magnetic volume per energy.

Figure 5:
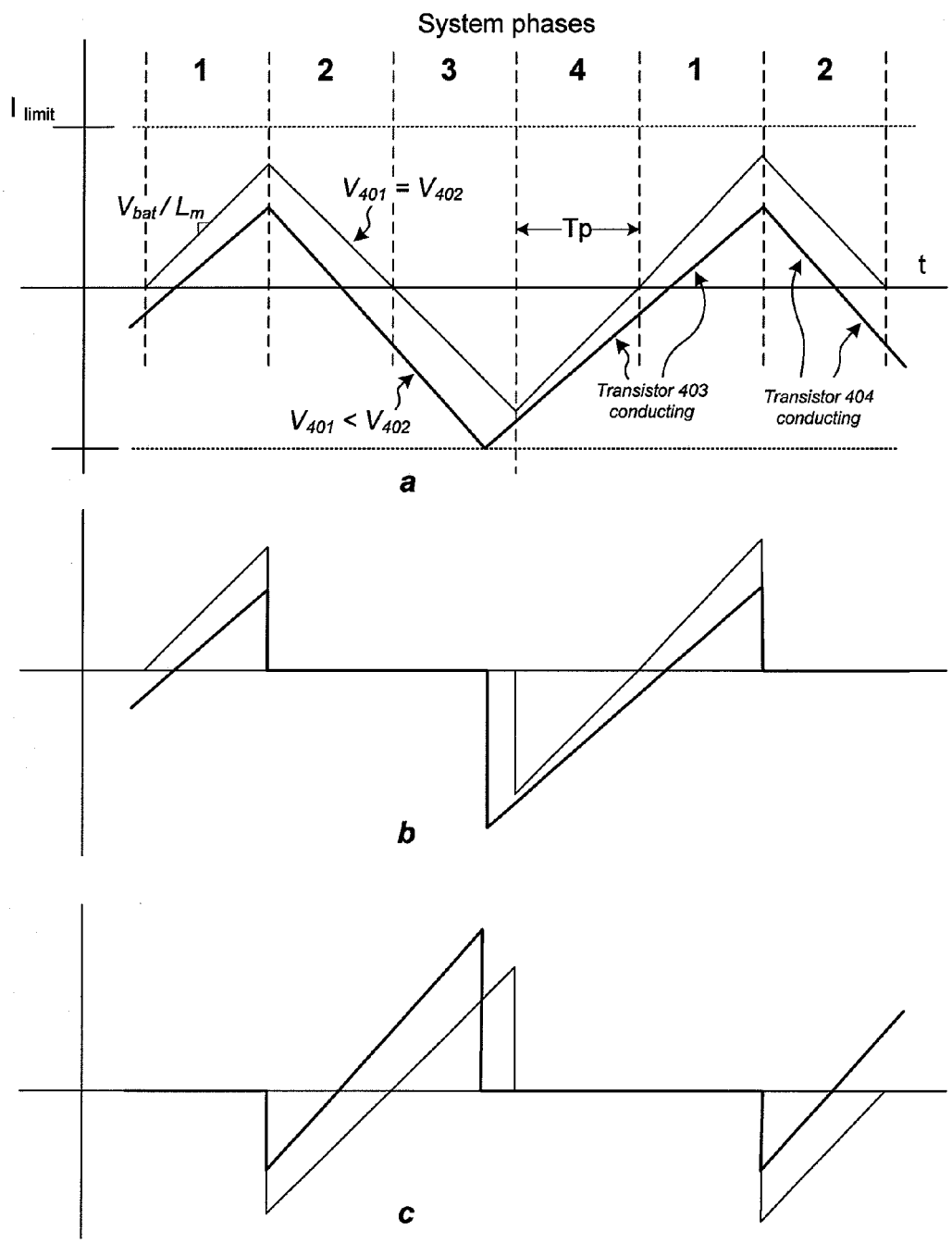
FIG. 5 shows three (3) graphs of typical waveforms from the circuit shown in FIG. 4, with Flyback equalization and equal voltage batteries (solid lines) and $V_{402} > V_{401}$ (bold lines): graph (a) is magnetizing current "I" in energy exchange transformer; graph (b) is current from battery 401; graph (c) is current from battery 402.

Since energy transfer from a transformer winding to the battery is immediately followed by transfer from the same battery to the transformer same winding, the transistors 403 and 404 can be switched closed for a fixed period of time Tp. As illustrated in FIG. 5, if both batteries are perfectly identical (voltage and impedance), switching equal amount of time transistors 403 and 404 will result in exchanging the same amount of energy from battery 401 to 402 than from 402 to 401. There is no net energy exchange in this mode. However, the resulting current pulses benefit to prevent battery sulfation.

If voltage of battery 402 is slightly higher than that of 401, the charging slope from battery 402 is faster than that of battery 401. Similarly, the discharge rate to battery 402 is faster than that to battery 401. A higher current is taken from battery 402 and sent to battery 401 than the opposite. As a result of this, the circuit operation will stabilize at an operating point where the batteries resistive voltage drop will compensate for the initial battery voltage difference. However, in the case of a larger voltage difference between batteries and to prevent unlimited current build-up from one battery to the other, a current limit ($I_{limit}$) is established by which the conducting period of transistor 404 (decaying current slope) is shortened with respect to transistor 403 (rising current slope). In this situation, the average current from battery 402 is higher than 0 and the average current from battery 401 is lower than zero which results in energy transfer from battery 402 to battery 401. It is thus required that current measurement, shown as sensor "I" be capable of DC measurement such as a Hall-effect transducer. Similarly, the energy exchange transformer must exhibit a low remanence level to prevent saturation. We refer to this as the flyback equalization process.

DBES—Multiple Batteries Configuration

Figure 6:
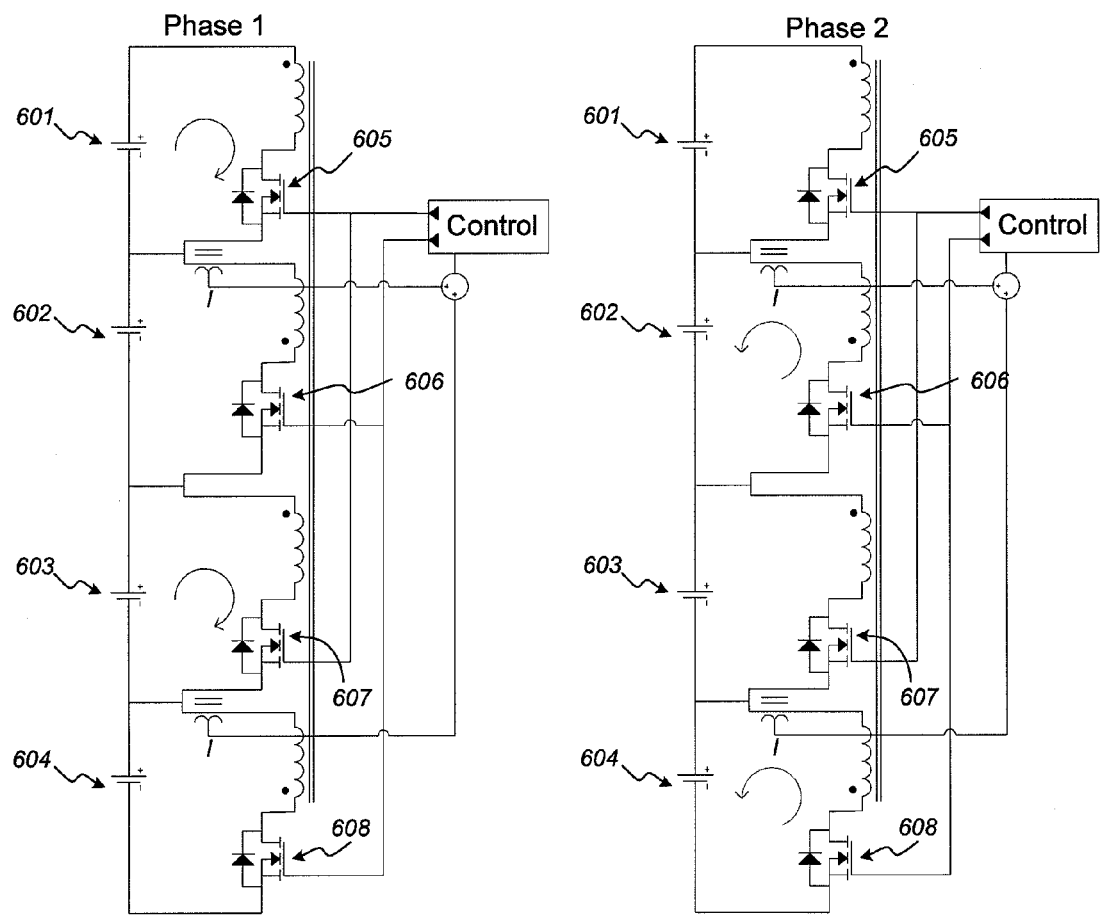
FIG. 6 is a schematic view of a circuit according to another preferred embodiment of the present invention using a first energy balance mechanism for several batteries.

The multiple batteries configuration of the invention is shown in FIG. 6. As for the two batteries reviewed above, the flyback energy exchange process is broken down in the same four distinct phases of which the first 2 only are shown. In the first phase, the transformer magnetic energy is charged from odd numbered batteries 601 and 603 together by turning on simultaneously odd numbered transistors 605 and 607. Similarly, phase 2 insures energy transfer from the transformer to even numbered batteries 602 and 604 while minimizing transistor losses by closing transistors 606 and 608. The diagram also illustrates that connections to the battery string may be per individual circuit or combined through shared wires.

Figure 7:
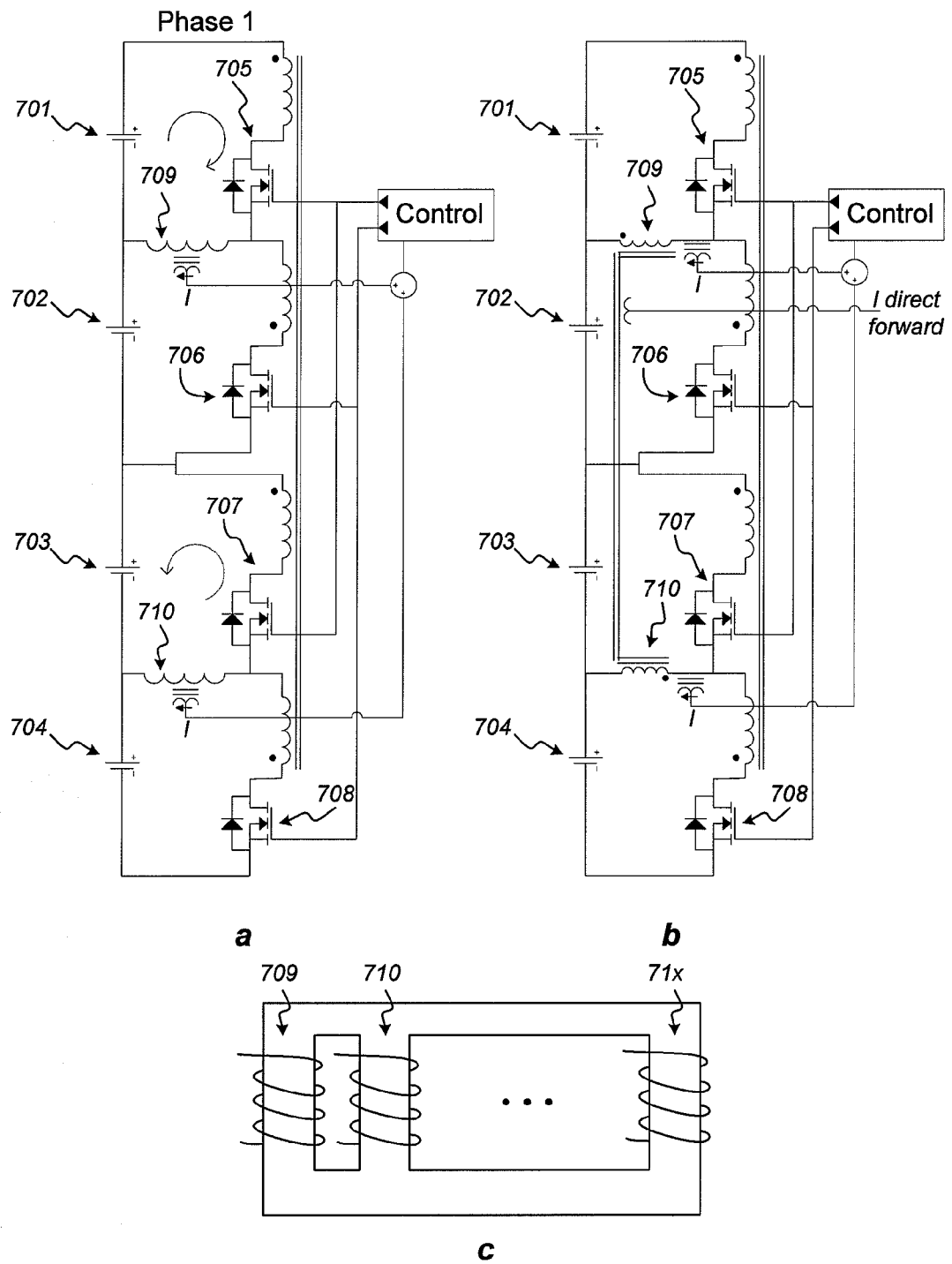
FIG. 7 is a schematic view of a circuit according to another preferred embodiment of the present invention using a second energy balance mechanism for several batteries through direct forward energy exchange, where graph (a) is general case of inter-batteries of same polarity during flyback phase 1 and graph (b) is a special case of 4 batteries with common core sharing inductor.

If one of the odd numbered batteries is of higher voltage than other odd numbered batteries, a new energy transfer mechanism takes places. As shown in FIG. 7a, when charging the inductive temporary energy buffer during phase 1, energy is also transferred directly from high voltage odd cells into low voltage odd cells. However, the current rise is now limited by the added inductors 709 and 710 as per: (VbatHigh−VbatLow)/L where VbatHigh is the voltage of the high-voltage battery 701, VbatLow is the voltage of the low-voltage battery 703 and L is the total summed inductance of the inductors 709 and 710. Similarly, when charging the transformer magnetizing inductance from the even numbered batteries in phase 3, if one of the batteries is of higher voltage than the others, it will directly transfer energy to the other even numbered batteries. During phases 2 and 4, energy accumulated through the flyback mechanism is rendered to batteries of opposite numbering. Energy is first transferred to the lowest voltage battery through the conducting diodes. When the corresponding transistors are closed, energy is also transferred between batteries of similar numbering as during charging if batteries are at different voltage levels. Inductors 709 and 710 must be designed to accommodate for DC current handling capability without saturation.

We will refer to this energy transfer process as the direct forward equalization process. When using very high-power batteries having fraction of milliohm typical impedances and high current capabilities, the addition of inductors 709 and 710 not only enables this added energy transfer process, it also prevents high current build-up that could damage the circuit components and/or disable normal operation of the previously presented "flyback" equalization process if batteries are at different voltage levels. Typically, the value of inductors 709 and 710 is much smaller than the value Lm of the flyback energy exchange inductor since it limits current rise between normally equal battery voltage levels. As shown, flyback control current "I" is the sum of both branch of inductor 709 and 710 current and does not account for direct forward energy transfer since this current is of opposite direction in the measuring sensors.

The proposed approach with multiple batteries can be extended to any number of batteries, even if the total number is not even. In the case of an odd total number of batteries, current drawn/recovered from/to odd numbered batteries will be lower than that of even numbered batteries in the same ratio as the number of batteries of each polarity.

A special embodiment of 4 batteries is treated and shown in FIG. 7b. This configuration enables the use of a coupled inductor 709/710. This special arrangement is beneficial in the sense that when batteries 701 and 703 are at different voltage levels, the inductance 709/710 reaches its maximum value and limits current exchange between them. On the other hand, if batteries 701 and 703 are at close voltage levels, the effect of inductor 709/710 fades away by flux cancellation thus improving the flyback energy exchange process by reducing the high-frequency voltage drop in 709/710. The flyback current control is summed as before in each 709 and 710 branches. Additionally, the direct forward current transfer measurement may be obtained by flux measurement in the combined 709/710 inductor. A more generalized embodiment consists in extending the approach for any number of battery pairs by using separate inductive legs in parallel for each of the inductors 709, 710 . . . 71x, as illustrated in FIG. 7c. This configuration is commonly found in 3-phase line inductors.

DBES—External Energy Exchange

Figure 8:
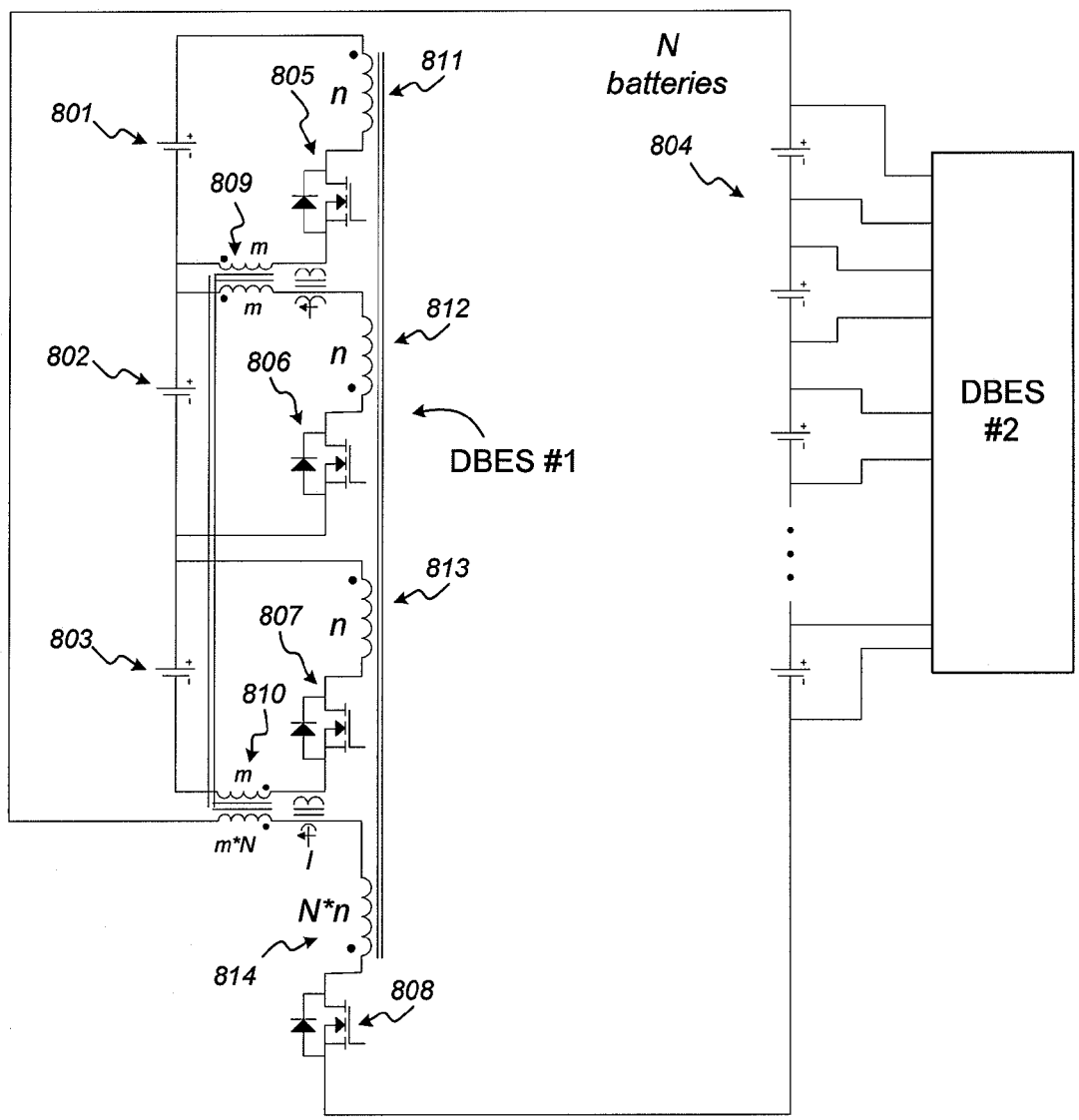
FIG. 8 is a schematic view of a circuit according to another preferred embodiment of the present invention using a third energy balance mechanism for several batteries in randomly distributed arrangements in an external battery energy exchange process.

In addition to the fact that a given system can cover any number of batteries, the batteries do not require to be connected in series or even in the same circuit since they are all isolated. Hence, an additional energy exchange process is proposed by which energy balance may take place with another group of batteries. This option is illustrated in FIG. 8 where two independent DBES systems are used to balance their respective groups of batteries. In addition, the DBES #1 has one of its balancing circuits connected to exchange energy with the set of isolated batteries 804. If each balance circuit branch (using transistors 805, 806 and 807) balances a single battery (respectively 801, 802 and 803) then the fourth circuit using transistor 808 may be connected to another set of N series batteries that may or not be isolated and or not equalized by another independent DBES #2. In this case, to insure proper operation of DBES #1, its Flyback energy exchange circuit has to be modified to account for different voltage levels. If all batteries are of the same typical voltage, typically of the same technology but most probably of the same type, then if the Flyback energy exchange inductor windings 811, 812 and 813 consists in n turns, winding 814 must have N*n turns. Similarly, the direct forward energy limiting inductor, represented previously by inductors 709 and 710 is split in multi-windings 809-810 to guarantee isolation between circuits. The winding ratios of those inductor windings also reflect the ratio of voltages. For single batteries m turns, the winding corresponding to the set 804 would contain m*N turns. The same principle will also apply to the current measuring sensor. This new energy exchange is called the multi-system energy exchange circuit.

As can also be emphasized, multi-winding construction of inductor part 809 could also enable isolation of batteries 801 and 802. This feature benefits to the fact that if the batteries 801 and 802 were originally connected together, in the case of accidental disconnection of the power link between them, no direct effect would be sensed by the DBES nor damaged incurred because of galvanic isolation. On the other hand, if the disconnection occurs inside one of the batteries or close to its connection post, then, by proper protection measures, it may be possible to suffer disconnection of one of the DBES circuit while keeping the remaining circuits alive and operational.

DBES—Optional Configuration and Circuit Supply

Figure 9:
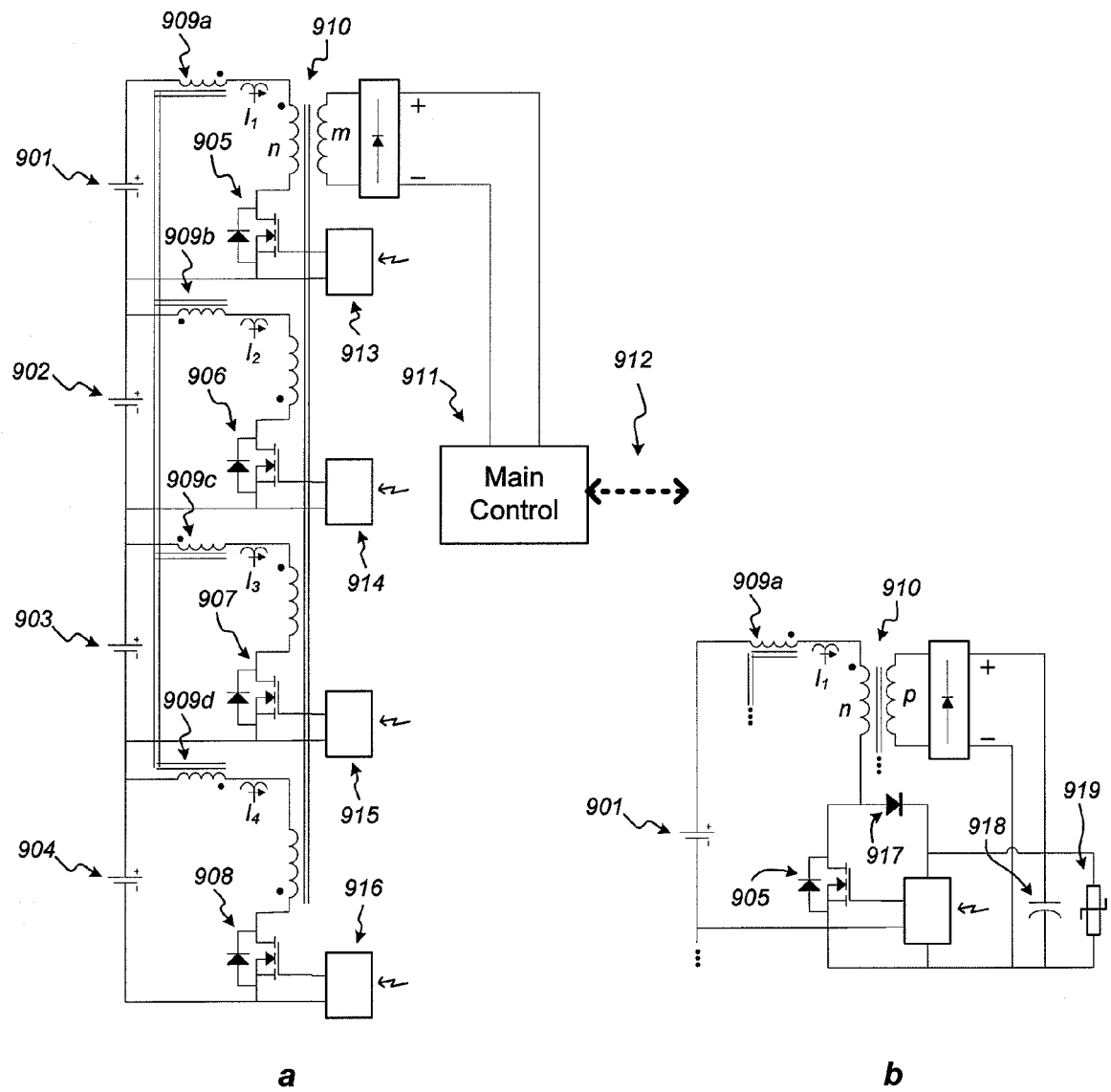
FIG. 9 is a schematic view of a circuit according to another preferred embodiment of the present invention using a global operating circuit with supply and control, including a basic control system (a); and control switch supplies (b).

As shown on FIG. 9a, we can extend the fact that we use galvanic isolation to a different connection topology that enables the use of similar circuits for each battery management section. As shown for 2 pairs of batteries, all windings of the direct forward energy exchange inductor 909 may be wound on the same inductance leg. If more than 2 pairs of batteries are to be equalized, each adjacent pair has to be wound on a single leg of a multi-leg inductor as illustrated in FIG. 7c. For example, 909a and 909b would be wound on the first leg, 909c and 909d on the second one, 909e and 909f on the third one and so on. With each battery circuit being isolated, the current measurement presents no problem since it already provides isolation.

Since the DBES operation is based on repetitive energy pulse exchanges, the system may be also used as a supply for alternate circuits. Also shown on FIG. 9a, the 4 batteries DBES can exchange data to a central monitoring device through a communication link 912 that may also provide start-up power to the DBES main control circuit. Once started, power to the main control may come from an added extra winding of the flyback energy exchange inductor 910 now operating as a transformer of which the number of turns will be determined by the ratio m:n corresponding to the level of voltage of the batteries and the control circuit requirements. Having the DBES main control 911 isolated from all (901 to 904) battery circuits enables that this control circuit be referenced to the central system monitoring system. The main control 911 may also be referenced to any of the batteries 901 to 904 thus enabling one of those to provide initial energy for the DBES start.

Each of the battery control transistors 905 to 908 has to receive its control signal from an isolated circuit, respectively 913 to 916, The isolation may be obtained from galvanically coupled gate transistors or, as shown, any other means of isolation, such as optic coupling. It may be required that each transistor gate drive be independently and galvanically supplied. Shown in FIG. 9b, additional supply circuit may also be derived as illustrated previously from extra winding p of the inductor 910. Individual windings of the direct forward and Flyback exchange inductors 909 and 910 have inherent leakage values. Although the design of those inductors should minimize leakage values, some of the trapped energy of the leakage may be recovered through diode 917 to supply the gate drive circuit. Any extra energy supplied from the leakage will be dissipated in the voltage limiting snubber circuit 919 that may consists in any combination of diodes, zener diodes, resistors, voltage limiters, etc. It may also be resent in the battery 901 with a more complex energy recovery circuit.

DBES—Monitoring Functions

Figure 10:
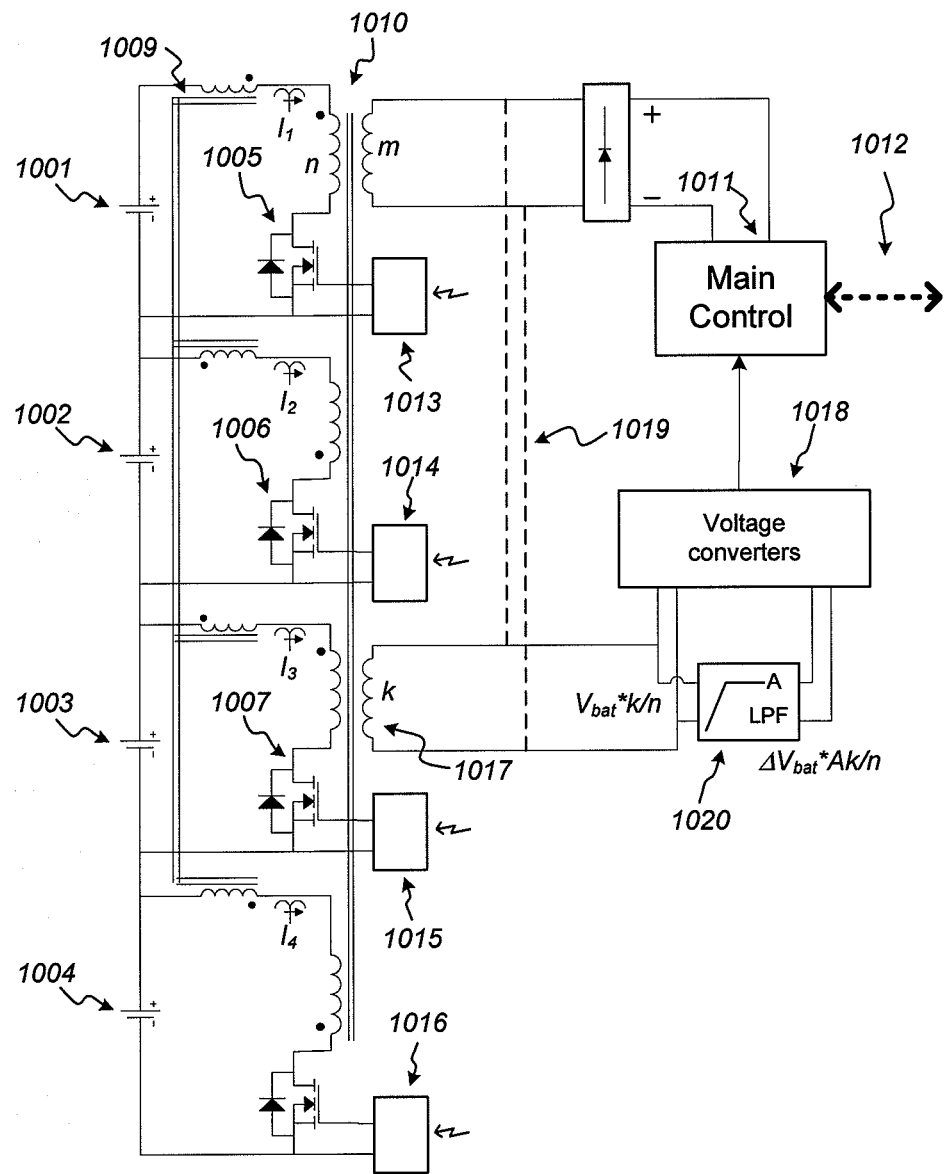
FIG. 10 is a schematic view of a circuit according to another preferred embodiment of the present invention using a global circuit with control and monitoring functions, including measurement and parameter identification, including battery internal resistance estimation.

Because of the energy exchange process taking place, FIG. 10 shows the added possibility of using an added winding 1017 to the inductor 1010 having k turns for voltage monitoring function. It provides an isolated monitoring circuit to the DBES Main control 1011. During any charging phase (1 and 3) of the Flyback energy exchange, the voltage appearing on winding 1017 is proportional to the ratio of number of turns k/n to the highest battery voltage of those presently charging (batteries 1001 and 1003 or batteries 1002 and 1004). During the discharge phases 2 and 4, the voltage appearing on winding 1017 is similarly proportional to the lowest battery voltage of those presently being recharged (batteries 1002 and 1004 or batteries 1001 and 1003). This voltage may then be converted in digital format through the 1018 converters for monitoring. Hence after a full cycle of odd and even numbered batteries charging and discharging, one is able to establish the highest and lowest voltages of both the odd and even numbered batteries. As illustrated in FIG. 10, to reduce the number of extra windings, the same transformer winding may be used to supply power to the control circuit as well to enable precise voltage measurement (dashed lines 1019).

Alternately, it is possible to gather more specific information of a single battery based on a different approach. It was previously considered that all even batteries associated transistors were driven in and off conduction simultaneously. It is possible however to drive each of the odd transistors one at a time and similarly each of the even transistors one at a time. This operating mode may be continuous or selected randomly when operating data measurements is desired on a specific battery. In a charging cycle, only the transistor driven in conduction will transfer energy to the transformer, enabling the associated battery voltage to be measured. In the discharge cycle, it is not so obvious since all "not driven" transistors have a conducting parallel diode. However, battery voltages are usually so close, and the DBES contributes to this equilibrium, that when a transistor is not closed, the required voltage to conduct through the parallel diode of the same polarity is not sufficient, hence ensuring that the battery that recovers the most energy is the one being connected by its conducting transistor. Hence, the measured voltage is also associated to this battery.

DBES—Resistance Estimation

A very important parameter of electrochemical batteries is their internal series resistance. In addition to measuring the battery voltage during the charge-discharge cycles, it is possible also to measure the charging and discharging currents of either the set of even or odd batteries or each individual battery as presented above. Internal resistance or variation trend is then estimated from those 2 parameters using the ohm law $R=V/I$.

The charging/discharging currents $I_1$ to $I_4$ are already measured through galvanically isolated current transducers. Batteries generally have a very low internal resistance. Hence, the voltage variation with respect to the nominal battery voltages may be small and difficult to measure with required high accuracy. It is possible to measure the voltage variation associated with the charge/discharge using a low-frequency high-pass filter and amplifier 1020 to eliminate the average DC voltage of the batteries and amplify the AC component of the charge/discharge cycles for a much higher accuracy.

If only one cell is being used for a given charge/discharge cycle as presented above, the current and voltage waveforms obtained may be used for resistance estimation of the associated battery.

DBES—Automatic Battery Fault Isolation

Since all batteries may be connected to the DBES circuit using galvanically isolated circuits, any opening of the battery string, when batteries are connected in series, may be detected and isolated of the remaining DBES using appropriate surge voltage limitation and fusible links.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation. The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method of equalizing a plurality of batteries, the method comprising the steps of:
   providing a first set of interconnected inductive windings wherein a first subset of such windings are wound in a first polarity configuration and a second subset of such windings are wound in a second polarity configuration;
   providing a plurality of controllable switches each directly connected in series with an associated winding of the first set of inductive windings to form a plurality of series-connected components each connected directly to one of the batteries;
   providing a second plurality of interconnected inductive windings each of which is connected in series with a battery and a series-connected component; and
   selectively operating the controllable switches to transfer power through inductive windings of the first set between selected one or more first batteries coupled to the windings of the first subset and selected one or more second batteries coupled to the windings of the second subset and wherein the inductive windings of the second set limit currents flowing between the batteries.

2. The method of claim 1, further including the step of detecting a parameter of a battery associated with the operated switch.

3. The method of claim 2, further including the step of detecting a resistance of a battery associated with the operated switch.

4. A battery equalization circuit, comprising:
   a plurality of batteries each directly connected to an associated one of a first plurality of subcircuits, wherein each subcircuit includes a single transistor and an associated one of a second plurality of magnetically linked inductive windings connected between the single transistor and to the associated battery and wherein at least some of the subcircuits further include an associated one of a third plurality of magnetically linked inductive windings;

wherein a first subset of windings of the second plurality of magnetically linked inductive windings are wound in a first polarity configuration and a second subset of windings of the second plurality of magnetically linked inductive windings are wound in a second polarity configuration; and a control for selectively operating the transistors to transfer power between one or more first batteries and one or more second batteries through inductive windings of the second plurality of magnetically linked inductive windings and wherein the inductive windings of the third plurality of magnetically linked inductive windings limit currents flowing between batteries when transistors connected to inductive windings of the first subset of windings are simultaneously operated.

5. The battery equalization circuit of claim 4, further including a monitoring circuit operable when a transistor is operated for detecting a parameter of a battery associated with the operated transistor.

6. The battery equalization circuit of claim 5, further including an estimation circuit operable when a transistor is operated for detecting a resistance of a battery associated with the operated transistor.

7. A battery equalization circuit, comprising:

a plurality of batteries each directly connected to an associated one of a first plurality of subcircuits, wherein each subcircuit includes a single transistor, an associated one of a second plurality of magnetically linked inductive windings, and an associated one of a third plurality of magnetically linked inductive windings and wherein the single transistor, the associated one of the second plurality of magnetically linked inductive windings, and the associated one of a third plurality of magnetically linked inductive windings are connected in series with the associated battery;

wherein a first subset of windings of the second plurality of magnetically linked inductive windings are wound in a first polarity configuration and a second subset of windings of the second plurality of magnetically linked inductive windings are wound in a second polarity configuration; and a control for selectively operating the transistors to transfer power without diode drops or substantial resistive losses between one or more first batteries and one or more second batteries through inductive windings of the second plurality of magnetically linked inductive windings and wherein the inductive windings of the third plurality of magnetically linked inductive windings limit currents flowing between batteries when transistors connected to inductive windings of the first subset of windings are simultaneously operated.

8. The battery equalization circuit of claim 7, further including a monitoring circuit operable when a transistor is operated for detecting a parameter of a battery associated with the operated transistor.

9. The battery equalization circuit of claim 8, further including an estimation circuit including the inductive windings of the third plurality of magnetically linked inductive windings and means operable when a transistor is operated for detecting a resistance of a battery associated with the operated transistor.

* * * * *